Oct. 19, 1965    G. R. CHURCHILL    3,212,819
METHOD OF MAKING A BUFFING WHEEL
Original Filed May 18, 1960    3 Sheets-Sheet 1
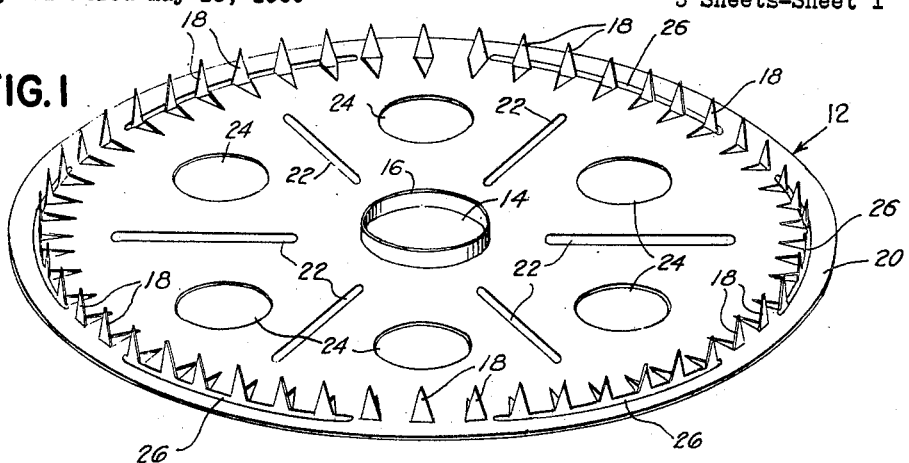
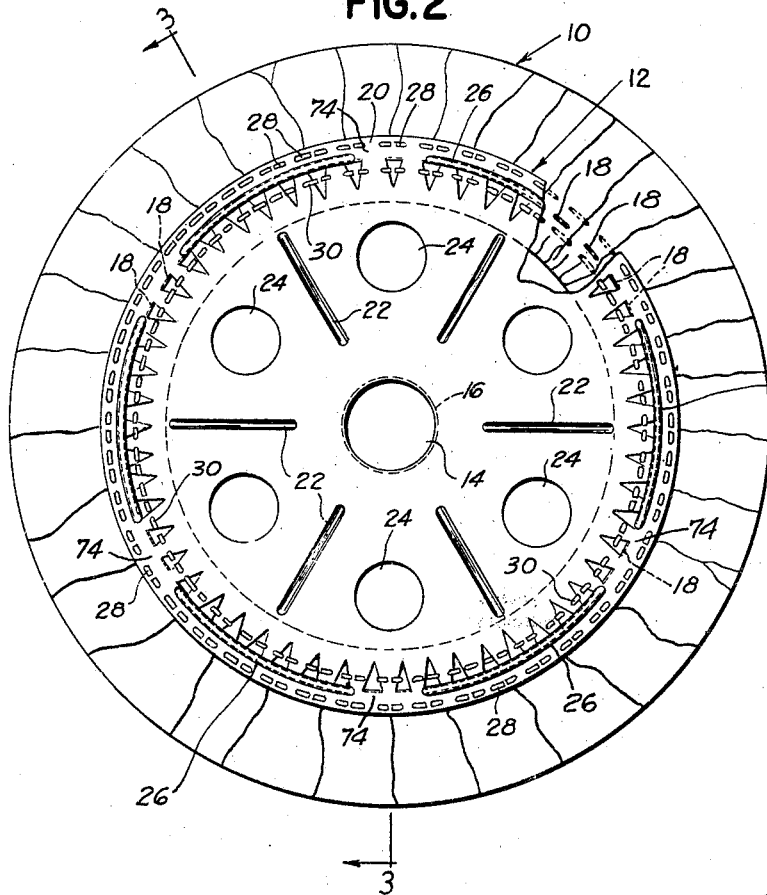
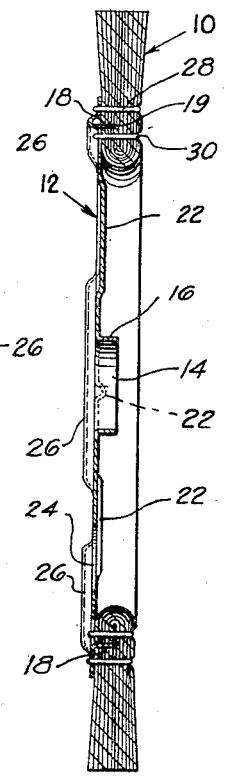
INVENTOR
George R. Churchill
BY Robert S. Churchill
ATTORNEY Oct. 19, 1965  G. R. CHURCHILL  3,212,819
METHOD OF MAKING A BUFFING WHEEL
Original Filed May 18, 1960  3 Sheets-Sheet 2

INVENTOR
George R. Churchill
BY Robert R. Churchill
ATTORNEY

Oct. 19, 1965  G. R. CHURCHILL  3,212,819
METHOD OF MAKING A BUFFING WHEEL
Original Filed May 18, 1960  3 Sheets-Sheet 3

INVENTOR
George R. Churchill
BY Robert L. Churchill
ATTORNEY

United States Patent Office 3,212,819
Patented Oct. 19, 1965

3,212,819
METHOD OF MAKING A BUFFING WHEEL
George R. Churchill, Cohasset, Mass., assignor to George R. Churchill Company, Inc., Hingham, Mass., a corporation of Massachusetts
Original application May 18, 1960, Ser. No. 29,842. Divided and this application Aug. 23, 1962, Ser. No. 219,006
4 Claims. (Cl. 300—21)

This application is a division of my copending application for Buffing Wheel, Serial Number 29,842, filed May 18, 1960, now abandoned.

This invention relates to a method of making a buffing wheel.

The invention has for an object to provide a novel method of making a buffing wheel embodying a novel retaining element which is particularly adapted for supporting a ring of buffing material and which lends itself to rapid and economical manufacture of the buffing wheel.

Another object of the invention is to provide a method of using an annular pronged disk in the manufacture of a buffing wheel for retaining a preformed ring of buffing material compressed thereagainst in its assembled form during subsequent operations for completing the production of the buffing wheel.

A further object of the invention is to provide a novel and practical method of making the present buffing wheel by which the buffing wheel may be rapidly and economically produced.

With these general objects in view and such others as may hereinafter appear, the invention consists in the buffing wheel and in the method of making the same as hereinafter described and particularly defined in the claims at the end of this specification.

In the drawings illustrating the preferred embodiment of the invention:

FIG. 1 is a perspective view of a pronged retaining disk employed in the manufacture of the present buffing wheel;

FIG. 2 is a side elevation of a buffing wheel embodying the retaining disk shown in FIG. 1;

FIG. 3 is a cross sectional view taken on the line 3—3 of FIG. 2;

Figure 4:
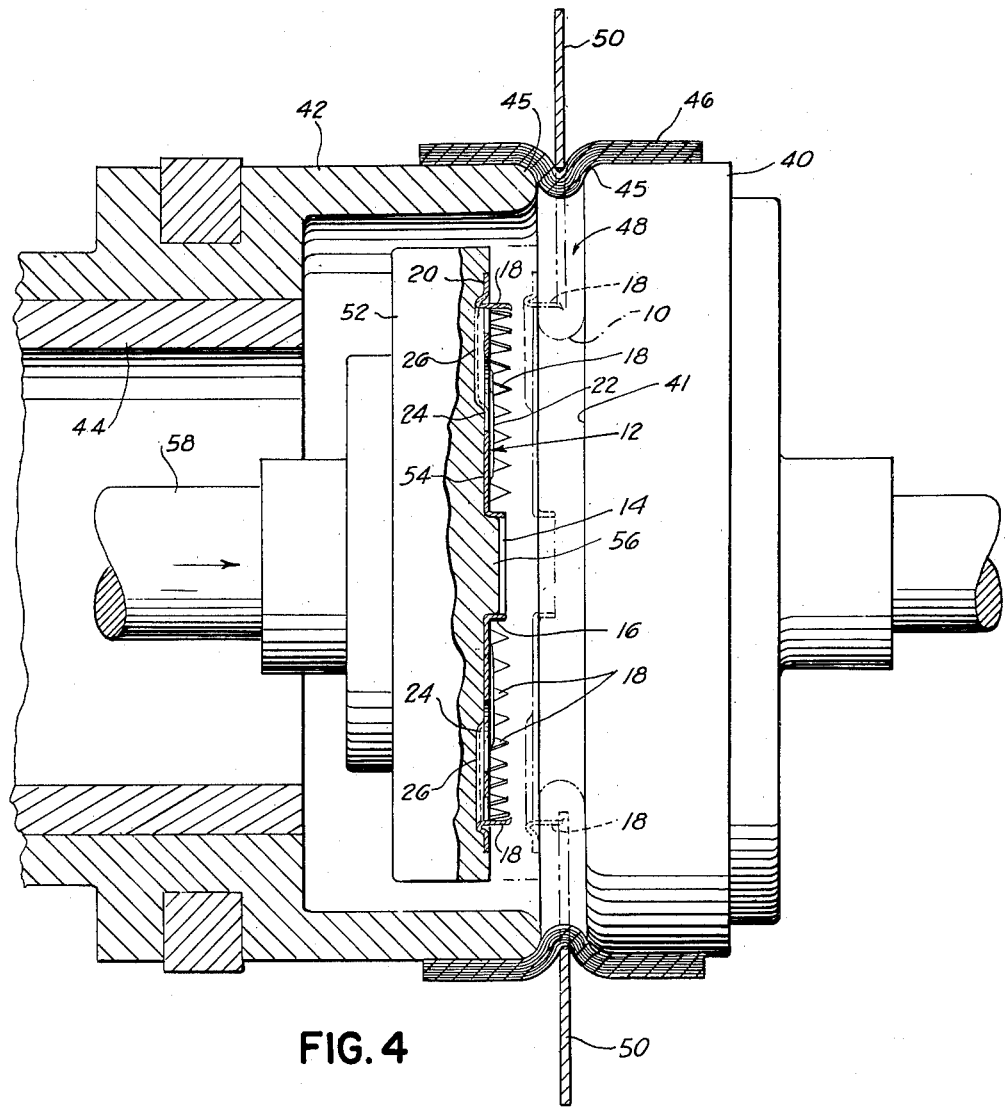
FIG. 4 is a cross sectional view of apparatus which may be employed in producing the present buffing wheel and illustrating a preferred method of forming a ring of buffing material and pressing the pronged disk into retaining engagement with the ring.

In general the present invention contemplates a novel and improved buffing wheel embodying a novel and improved circular pronged metal disk forming the supporting hub of the wheel. The disk is provided with a circular row of spaced toothlike prongs adjacent its outer edge arranged substantially at right angles to and extending laterally from the face of the disk, and in practice the disk, positioned in concentric relation to a preformed annular ring of buffing material, is pressed into the annular ring adjacent the inner periphery thereof to force the prongs into the material and to compress the material to provide a partially assembled unit retained in its assembled relation by the retaining disk. The unit thus retained in its partially assembled relation may then be conveniently handled and placed in a stapling machine where one or more circular rows of staples are pressed through the buffing material and clinched over the metal disk to permanently secure the buffing ring to the disk and thus complete the buffing wheel section.

Referring now to the drawings and particularly to FIG. 2, the buffing wheel therein illustrated comprises a flat ring of buffing material 10 produced by winding a relatively wide strip of flexible buffing material, such as a bias cut fabric, into cylindrical form, collapsing the cylinder midway between the ends of the cylindrical structure and then flattening the structure to present opposed faces into superimposed relation to form an annular flat buffing element, U-shaped in cross section, as indicated in FIG. 3. The ring 10 of buffing material is secured to a central disk comprising a hub member indicated generally at 12 for assembly on an arbor or shaft, and in accordance with the present invention the hub member comprises a circular sheet metal retaining disk or center having an arbor hole or central opening 14 defined by a circular rim 16. Adjacent the outer marginal edge of the disk is provided a circular row of circumferentially spaced toothlike prongs 18 extending substantially at right angles from the face of the disk. As shown in FIG. 1, the pointed triangular prongs may be formed by stamping out portions of the metal disk, and the prongs are disposed in a circle preferably spaced inwardly from the outer periphery of the disk leaving an outer band or marginal portion 20 of metal extending beyond the row of prongs. The prongs may preferably be slightly downwardly inclined. The disk is also provided with a plurality of radially extended, relatively shallow die-set strengthening ribs 22 and with a plurality of circumferentially spaced air circulating openings 24. Spaced portions of the disk adjacent the row of prongs 18 are provided with relatively deep arcuate die-set portions comprising spacing ribs 26 for a purpose which will presently appear.

As illustrated in FIGS. 2 and 3, the retaining disk 12 is arranged concentrically with relation to the preformed ring 10 of buffing material. In order to retain the ring 10 of buffing material in its preformed condition and to maintain the predetermined inside diameter of the inner periphery of the ring constant, the prongs 18 are driven at a slightly downwardly inclined angle and with substantial force into the fabric adjacent the inner periphery of the ring, thus forming a partially assembled unit capable of being handled during subsequent operations without displacement or distortion of the assembly. In practice, to complete the buffing wheel, one or more circular rows of staples, herein shown as two rows 28, 30, are then driven into the fabric structure and through the metal disk, the staples being clinched over the metal disk, as shown, to complete the assembly of the buffing wheel section. As illustrated, one row 28 of staples is driven through the band 20 beyond the circular row of prongs 18, and the other row of staples 30 is driven into the disk within the circular row of prongs 18.

Referring now to FIG. 4, illustrating one form of apparatus which may be used in producing the present buffing wheel, the cylindrical member 40 comprises a stationary drum, and the member 42 comprises a longitudinally movable sleeve mounted on a hollow shaft 44. The outside diameter of the sleeve is the same as the outside diameter of the drum, and the facing edges of the drum and the sleeve, respectively, are rounded as indicated at 45. In operation the sleeve is moved to a predetermined spaced distance from the drum, and a strip of bias cut fabric indicated at 46 may be wound about the drum and the sleeve in a central position relative to the space 48 formed between the face of the drum and the end of the sleeve. The strip is thus wound into cylindrical form, and when a suitable number of plies of material has been wound about the cooperating sleeve and drum elements provision is made for contracting the fabric cylinder medially thereof to draw the material down forming a ring of buffing material having a predetermined inner periphery. The contracting mechanism may comprise any of the so-called "iris" type of contracting mechanisms wherein arcuately shaped and pivoted arms indicated generally at 50 are caused to engage and contract the material medially of the cylinder, the material being urged inwardly down between the sleeve and the drum to form the continuous ring of buffing element 10. In practice the contracting or drawing-down operation may be terminated at a predetermined point to produce a ring 10 having a preselected inside diameter which is maintained constant by the prongs of the disk 12, the inside diameter being indicated in broken lines in FIG. 4.

Provision is then made for pressing the prongs 18 of the pronged retaining disk 12 into the marginal edge of the ring 10 adjacent the inner periphery thereof to hold and retain the preformed ring of buffing material in its partially assembled form. As illustrated in FIG. 4, the member 52 comprises a movable drum forming a part of a press and is arranged to support a retaining disk 12 in concentric relation to the ring 10. As shown, the face 54 of the drum may be recessed to form a pocket in which the disk may be retained with the prongs 18 extended outwardly from the face. The drum 52 may also be provided with a central hub portion 56 over which the rim 16 defining the central opening of the disk is placed. The movable drum 52 may be operatively connected to the piston 58 of a pneumatic or hydraulic cylinder, not shown, and in operation the pronged retaining disk 12 is pressed against the preformed ring of buffing material with considerable force such that the prongs 18 are caused to penetrate into buffing material adjacent the contracted or drawn-down inner periphery thereof while the ring of material is supported against the face 41 of the stationary drum 40 to retain the ring 10 in its partially assembled form and to particularly maintain the inside diameter of the ring at its contracted or drawn-down dimension by holding the same against its tendency to expand without utilizing auxiliary clamping or holding means during subsequent handling of the ring and during the stapling operation wherein assembly of the buffing wheel is completed.

As herein illustrated, the prongs 18 are of a length such as to extend through about one-half or slightly more than one-half of the thickness of the ring of buffing material, leaving the other approximately one-half of the thickness of the ring free of the retaining prongs. However, it was found in practice that the pressure applied to the annular structure of buffing material during the driving of the prongs into the material was such as to so firmly compress and compact the ring of buffing material adjacent the inner periphery that the ring will retain its compressed condition when removed from the press. Incidental to the stamping operation in forming the prongs 18, the extreme ends or points thereof are deformed slightly to provide relatively small hooks, as indicated at 19, and while the hooks are not large enough to deter the passage of the prongs into the buffing ring when pressure is applied, as described, yet after the prongs are inserted the hooks 19 assist in urging the prongs into a clinched-over position and also serve to resist withdrawal of the prongs from the ring.

It will be understood that in practice the retaining disk 12 is placed in the recessed pocket on the face 54 of the drum 52 prior to the fabric winding operation and at a time when the sleeve member 42 is in a retracted position, the drum 52 also being in a retracted position at this time. Thereafter, the sleeve 42 is moved into predetermined spaced relation to the stationary drum 40, and the strip of fabric is wound about the spaced members whereupon the medial portion of the fabric cylinder is drawn down as described. It will also be understood that the contracting arms 50 may be removed after the initial engagement of the prongs 18 with the fabric during the assembling and compressing operation. The sleeve member 42 and the drum 52 may then be retracted and the partially assembled disk and ring unit may be removed. It will be further understood that while the disk 12 is described primarily as a retaining member, it will be apparent that it also serves together with the staple fasteners as a hub securing member to resist separation of the plies of the buffing ring during the commercial operation of the assembled buffing wheel unit.

Figure 5:
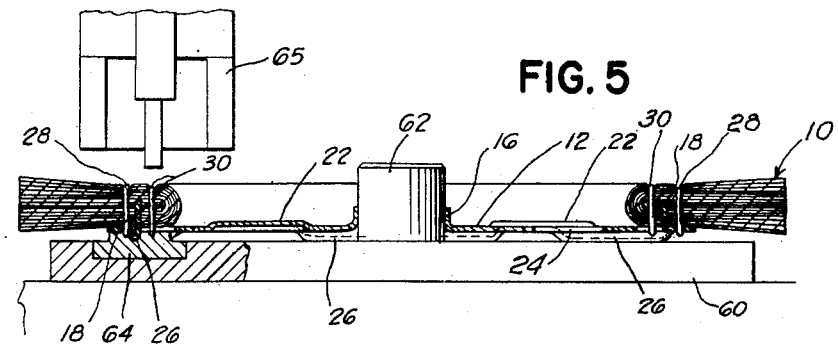
FIG. 5 is a cross sectional view of apparatus illustrating the step of completing the assembly of the buffing wheel while the ring of buffing material is retained in assembled relation by the pronged disk.

The partially assembled and compactly compressed unit may then be placed in a stapling machine, as illustrated in FIG. 5, which includes a base member 60 provided with an upstanding central stud 62 over which the central opening defined by the rim 16 of the disk is fitted. A portion of the base is provided with an anvil 64 for cooperation with a stapling head diagrammatically indicated at 65. In operation the stapling head 65 may be aligned relative to the assembled unit to apply a row of staples 28 on one side of the circular row of prongs 18, the buffing wheel section being rotated through a small arc between successive stapling operations to space the staples as shown in FIG. 2. Thereafter, the stapling head 65 may be aligned to apply a row of staples 30 on the other side of the prongs 18 as indicated in FIG. 5.

Figure 7:
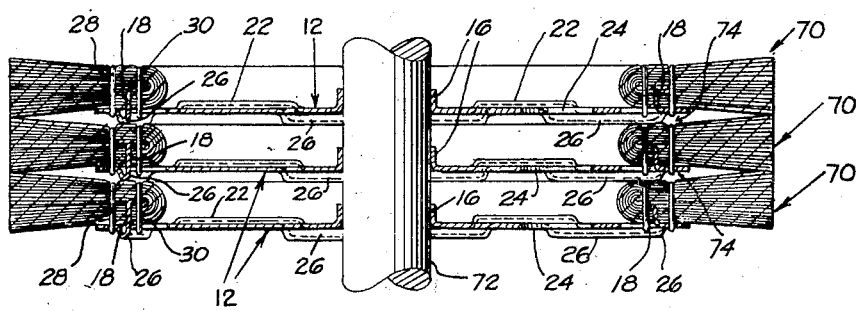
FIG. 7 is a cross sectional view showing a plurality of the present buffing wheel sections mounted on an arbor to form a buffing roll.

As illustrated in FIG. 7, a plurality of buffing wheel sections 70 thus formed may be mounted side by side on an arbor 72 to form a buffing roll or buffing surface, the sections being clamped longitudinally of the arbor to complete the roll. When thus assembled, it will be seen that the arcuate die-set portions 26 of one section bear against the face of the ring of fabric of an adjacent section at a point substantially in alignment with the row of prongs 18 to serve as spacing members providing an air space between adjacent sections. Thus, in operation air is permitted to circulate between adjacent sections for cooling purposes by virtue of the openings 24 in the disks and the spaces 74 formed by the arcuate die-set elements 26.

Figure 6:
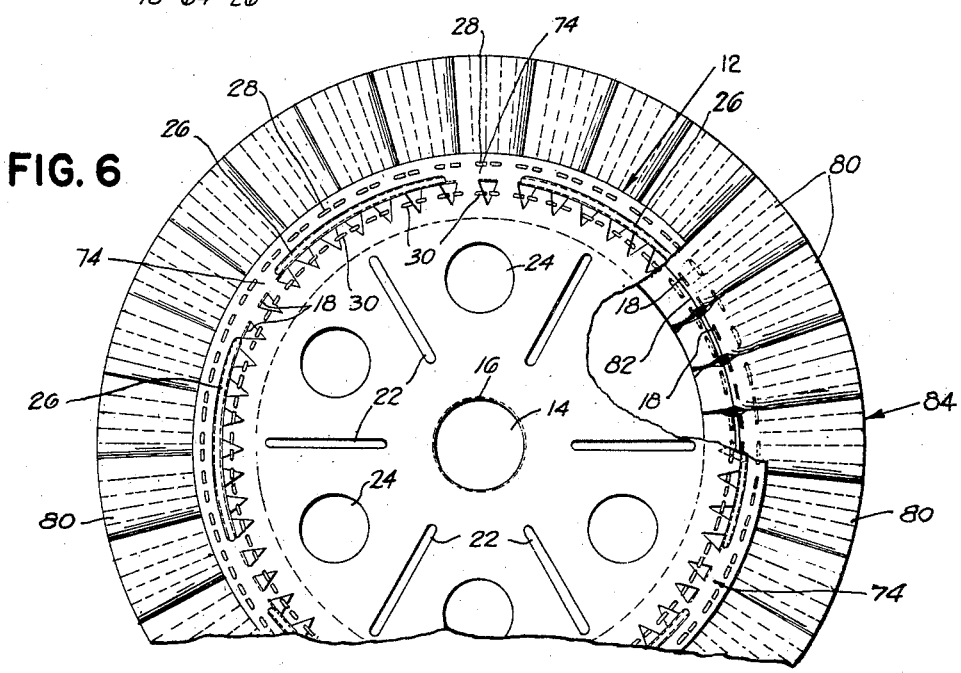
FIG. 6 is a side elevation of a modified form of buffing wheel embodying the pronged retaining disk.

Referring now to FIG. 6, in a modified form of the present buffing wheel, the ring of buffing material may comprise a plurality of radially extended buffing elements indicated at 80 connected together at their inner ends, preferably by weaving wires 82 extending around adjacent buffing elements to form the ring indicated generally at 84. The ring of individual buffing elements thus formed may be supported against the front face 41 of the stationary drum 40 in concentric relation to the retaining disk 12, and the disk is then pressed against the ring with considerable pressure to cause the prongs 18 to extend into the buffing elements in the manner above described to form a partially assembled unit which may be handled without displacement of the parts during the subsequent stapling operation. In practice the ring 84 may be supported on the drum 40 in concentric relation to the disk 12 in any usual manner, such as by a circular ridge, not shown, extended from the face 41 and of a size such as to fit within the inside diameter of the ring 84.

From the foregoing description it will be seen that the present buffing wheel embodies a novel hub member adapted to serve as a retaining disk for maintaining the ring of buffing material in assembled relation with the disk during subsequent handling thereof to perform the stapling operations without the use of auxiliary clamping elements. It will also be observed that the present buffing wheel may be rapidly and economically produced to provide an efficient and superior buffing wheel which may be used with advantage for a wide variety of buffing purposes.

While the preferred embodiment of the invention has been herein illustrated and described it will be understood that the invention may be embodied in other forms within the scope of the following claims.

Having thus described the invention what is claimed is:

1. In the method of making a buffing wheel section of the character described the steps comprising winding a strip of buffing material about spaced cylindrical elements to provide a multi-ply cylindrical structure contracting the cylindrical structure about a medial line and into the space between the elements to provide a flat ring structure U-shaped in cross section supporting a retaining disk having a circular row of laterally extending prongs adjacent its outer periphery in a press and in concentric relation to the ring with the prongs directed toward the marginal portion adjacent the inner periphery of the ring then compressing the disk and the ring together with substantial pressure to cause the prongs to penetrate the ring to a depth of over one-half of the layers of the flat ring of U-shaped cross section without passing through the full thickness of the ring and to provide a partially assembled buffing wheel section including the unpenetrated portion of the ring capable of maintaining its assembled relation during subsequent handling without clinching said prongs, then removing the partially assembled section from the press and permanently securing the ring to the disk.

2. The method defined in claim 1 wherein the step of permanently securing the ring to the disk consists in applying at least one circular row of staples through the ring and the disk.

3. The method of making a buffing wheel section, the steps comprising; supporting in a press, a retaining disc having a row of laterally extended prongs adjacent its outer periphery; winding a strip of flexible buffing material into cylindrical form, contracting the cylinder midway between its ends and flattening the same to provide a flat ring of buffing material, U-shaped in radial cross-section and having a tendency to expand; positioning the ring upon the prongs in concentric relation to the disc; compressing the disc and the ring together with substantial pressure to cause the prongs of the disc to penetrate the marginal portion of the ring adjacent the inner periphery thereof to a depth of over one-half of the layers of the flat ring without passing through the full thickness of the ring to maintain the buffing wheel including the unpenetrated portion of the ring in its partially assembled relation to prevent expansion during subsequent handling, and removing the partially assembly section from the press and permanently securing the ring to the disc.

4. The method defined in claim 3 including applying at least one row of staples through the ring of buffing material and the disc on both sides of the row of prongs to permanently secure the ring to the disc.

References Cited by the Examiner

UNITED STATES PATENTS 2,017,925 10/35 Siefen.
2,650,861 9/53 MacFarland _____ 300—1
2,687,602 8/54 Churchill _____ 51—193

FOREIGN PATENTS 157,225 6/54 Australia.

WHITMORE A. WILTZ, *Primary Examiner.*

JOHN F. CAMPBELL, *Examiner.*